United States Patent
Ausenda

(10) Patent No.: US 9,697,738 B2
(45) Date of Patent: Jul. 4, 2017

(54) SIMULATOR DEVICE OF NAVIGATION ON A SAILING BOAT

(71) Applicants: ETS ELETTRONICA S.r.L., Motta Visconti (Milan) (IT); Giovanni Ausenda, Casorate Primo (Pavia) (IT)

(72) Inventor: Giovanni Ausenda, Casorate Primo (IT)

(73) Assignees: Giovanni Ausenda, Casorate Primo (IT); ETS ELETTRONICA S.r.L., Motta Visconti (IT)

( * ) Notice: Subject to any disclaimer, the term of this patent is extended or adjusted under 35 U.S.C. 154(b) by 248 days.

(21) Appl. No.: 14/795,098

(22) Filed: Jul. 9, 2015

(65) Prior Publication Data

US 2016/0063884 A1 Mar. 3, 2016

(30) Foreign Application Priority Data

Sep. 3, 2014 (IT) .......................... MI2014A001536

(51) Int. Cl.
G09B 9/06 (2006.01)
(52) U.S. Cl.
CPC .................................. *G09B 9/066* (2013.01)
(58) Field of Classification Search
USPC .................................. 434/29, 55, 56, 58, 60
See application file for complete search history.

(56) References Cited

U.S. PATENT DOCUMENTS

| | | | | |
|---|---|---|---|---|
| 2,208,083 A | * | 7/1940 | Rousseau ............... | G09B 9/066 434/60 |
| 2,855,702 A | | 10/1958 | Taylor | |
| 3,305,943 A | | 2/1967 | Hansen | |
| 3,471,943 A | * | 10/1969 | Duval .................... | G09B 9/066 434/60 |
| 3,597,856 A | * | 8/1971 | Waddington ........... | G09B 9/066 434/60 |

(Continued)

FOREIGN PATENT DOCUMENTS

EP 2 216 765 A1 8/2010

OTHER PUBLICATIONS

Italian Search Report for Italian Patent Application No. MI20141536, two pages, completed Apr. 23, 2015.

*Primary Examiner* — Kurt Fernstrom
(74) *Attorney, Agent, or Firm* — Vorys, Sater, Seymour & Pease LLP

(57) ABSTRACT

Provided is a simulator device of a sailing boat including: a fixed structure, configured to support the simulator device on the ground, a support structure configured to firmly support the sailing boat, a rotatable connection means of the support structure to the fixed structure, configured to allow the rotation of the support structure around a substantially vertical axis and with respect to the fixed structure, and a tilting connection means of the support structure to the fixed structure, configured to allow the rotation or tilting of the support structure around a longitudinal axis, perpendicular to the vertical axis, wherein the tilting support includes an articulated quadrilateral including two lower hinges connected to a lower non-tilting element, two upper hinges connected to an upper tilting element, rods which connect said lower hinges to said upper hinges in an intersecting manner, and elastic contrast means of the tilting of said articulated quadrilateral.

10 Claims, 5 Drawing Sheets

(56) References Cited

U.S. PATENT DOCUMENTS

| | | | | |
|---|---|---|---|---|
| 3,693,264 A | * | 9/1972 | Waddington | G09B 9/066 434/60 |
| 3,747,230 A | * | 7/1973 | Duval | G09B 9/066 434/60 |
| 3,763,304 A | * | 10/1973 | Duval | G09B 9/066 346/8 |
| 3,783,530 A | * | 1/1974 | Duval | G09B 9/066 434/60 |
| 3,940,862 A | | 3/1976 | Nishimura | |
| 4,158,263 A | * | 6/1979 | Weihe, Jr. | G09B 9/066 434/60 |
| 2009/0119030 A1 | * | 5/2009 | Fang | A63B 24/0006 702/41 |
| 2011/0281244 A1 | * | 11/2011 | Ausenda | G09B 9/066 434/60 |

\* cited by examiner

SIMULATOR DEVICE OF NAVIGATION ON A SAILING BOAT

TECHNICAL BACKGROUND OF THE INVENTION

The present invention relates to a simulator device of navigation on a sailing boat comprising: a fixed structure, suitable to support said simulator device on the ground, a support structure, suitable to firmly support the sailing boat, rotatable connection means of the support structure to the fixed structure, suitable to allow the rotation of said support structure around a substantially vertical axis and with respect to the fixed structure, tilting connection means of said support structure to said fixed structure, suitable to allow the rotation or tilting of said support structure around a longitudinal axis perpendicular to the vertical axis.

DESCRIPTION OF THE PRIOR ART

Several kinds of simulator devices for sailing boats are currently known of.

Said simulators are in fact used in the seasons and in places where it is difficult to use a real sailing boat in the water, i.e. at sea or in a lake.

Said simulation devices consist mainly of virtual systems.

They therefore comprise screens, controls and moving platforms which simulate the reactions and behaviour of a sailing boat in the water.

Said virtual simulation apparatuses have some significant drawbacks.

In fact, as known, virtual apparatuses cannot give the user the same sensation as a real apparatus.

However sophisticated, in fact, the software presents approximations and assessments that do not coincide with the situations and reactions of a real boat.

In addition, the user's sensations are attenuated and altered by the awareness of being in a virtual system.

Consequently, virtual simulation devices are not entirely suitable to teach a neophyte or offer experience to an amateur.

The virtual appliances are lastly very expensive and complicated.

Some mechanical simulator devices which exploit wind power and elastic elements designed to simulate the behaviour of a sailing boat in the water have then been made.

The latter partly solve some of the aforementioned drawbacks, but are too approximate and coarse to simulate a situation of navigation at sea or on a lake in an optimal manner.

The applicant has described a particular simulator device of the mechanical type in the patent EP-B-2216765. This device is extremely precise and faithfully reproduces the conditions of actual navigation.

However, said device is very cumbersome and is difficult to transport.

Moreover, it would be preferable to further improve the simulation, and thus the mechanical response of the device.

In this situation the technical purpose of the present invention is to devise a simulation apparatus for sailing boats able to substantially overcome the drawbacks mentioned above.

Within the sphere of said technical purpose one important aim of the invention is to obtain a simulator device of navigation in a sailing boat which best simulates the reactions and behaviour of a sailing boat in water and which gives the user sensations and impressions similar to those of a sailing boat in the water.

Another important object of the invention is to provide a simulator device of navigation in a sailing boat which is compact, small in size and easy to transport.

Another important object of the invention is to provide a simulator device of navigation in a sailing boat which is simple and economical.

SUMMARY OF THE INVENTION

The technical purpose and specified aims are achieved by a simulator device of navigation in a sailing boat comprising: a fixed structure, suitable to support the simulator device on the ground, a support structure suitable to firmly support the sailing boat, rotatable connection means of the support structure to the fixed structure, suitable to allow the rotation of the support structure around a substantially vertical axis and with respect to the fixed structure, tilting connection means of the support structure to the fixed structure, suitable to allow the rotation or tilting of the support structure around a longitudinal axis, perpendicular to the vertical axis, wherein the tilting connection means comprise: an articulated quadrilateral comprising: two lower hinges, connected to a lower non-tilting element, two upper hinges connected to an upper tilting element, rods connecting the lower hinges to the upper hinges in an intersecting manner and elastic contrast means of the tilting of the articulated quadrilateral.

BRIEF DESCRIPTION OF THE DRAWINGS

The characteristics and advantages of the invention are clearly evident from the following detailed description of preferred embodiments thereof, with reference to the accompanying drawings, in which.

DESCRIPTION OF THE PREFERRED EMBODIMENTS

Figure 1:
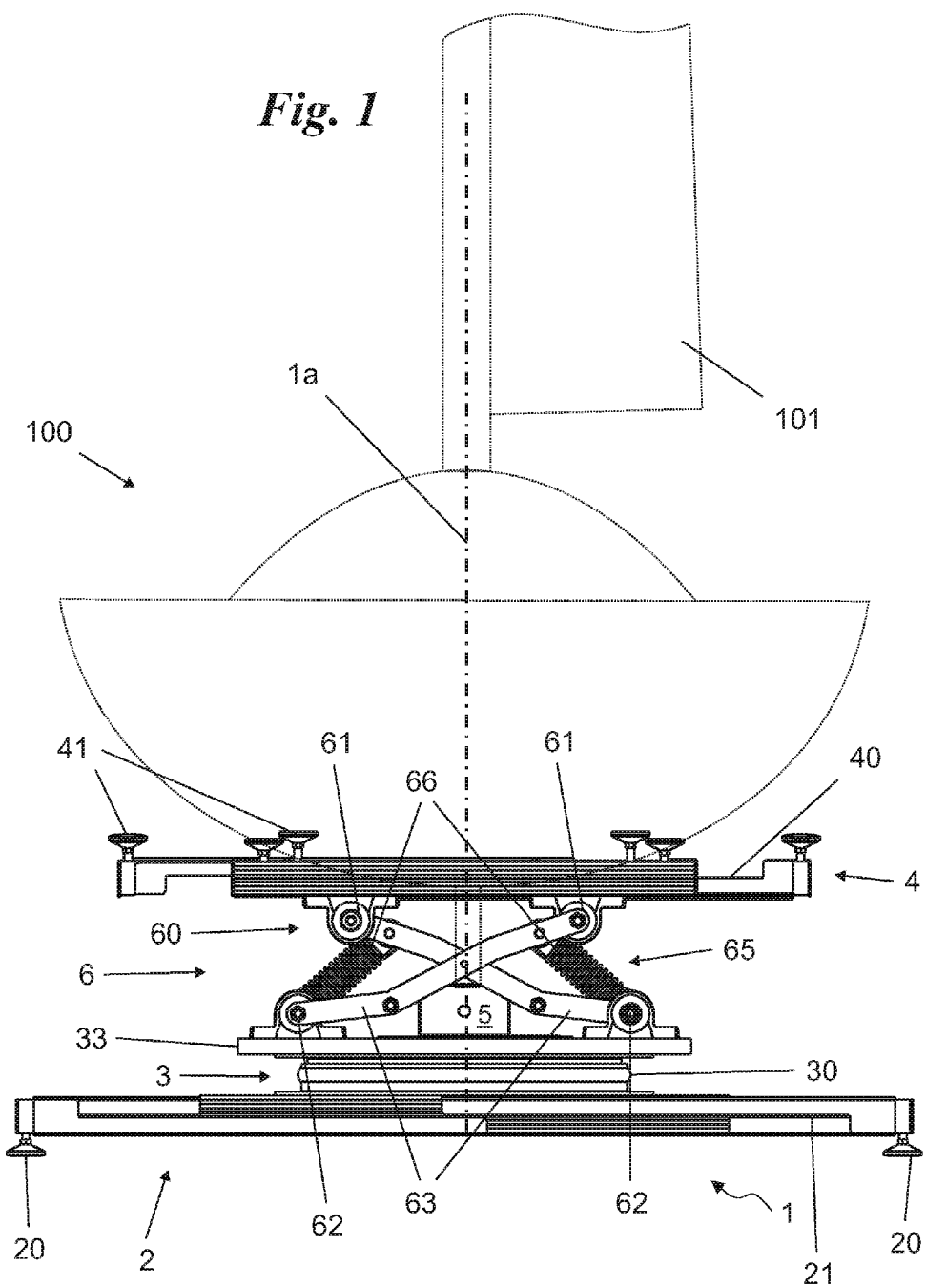
FIG. 1 shows a simulator device of navigation in a sailing boat according to the invention in a front view and supporting a sailing boat.

With reference to the drawings, reference numeral 1 globally denotes a simulator device of navigation in a sailing boat according to the invention.

It may be associated with a sailing boat 100, possibly after some modifications to the same, as further specified below.

The simulator device 1 comprises, briefly, a basic fixed structure 2, rotatable connection means 3, at least partially freely rotatable around a substantially vertical axis 1a, tilting connection means 6 and a support structure 4 suitable to support the sailing boat 100 and connected to the fixed structure via said connection means 3 and 6.

Preferably, the tilting connecting means 6 are supported by rotatable connection means 3, but the opposite is also possible.

The fixed structure 2 is positioned on the ground and possibly equipped with wheels, suitable for its transport, and fixed, adjustable supports 20 suitable for its constraint to the ground (FIG. 1).

The fixed structure 2 further comprises a plurality of support arms 21 preferably telescopic, and four in number. These are of appropriate length and suitable to prevent the overturning of the apparatus 1 including the boat 100.

The rotatable connection means 3 are constrained to the fixed structure 2 and comprise a platform 33, rotatable in relation to the said fixed structure 2 along the vertical axis 1*a*, and preferably consisting of a base or substantially rectangular plate lying in the horizontal plane.

Figure 4:
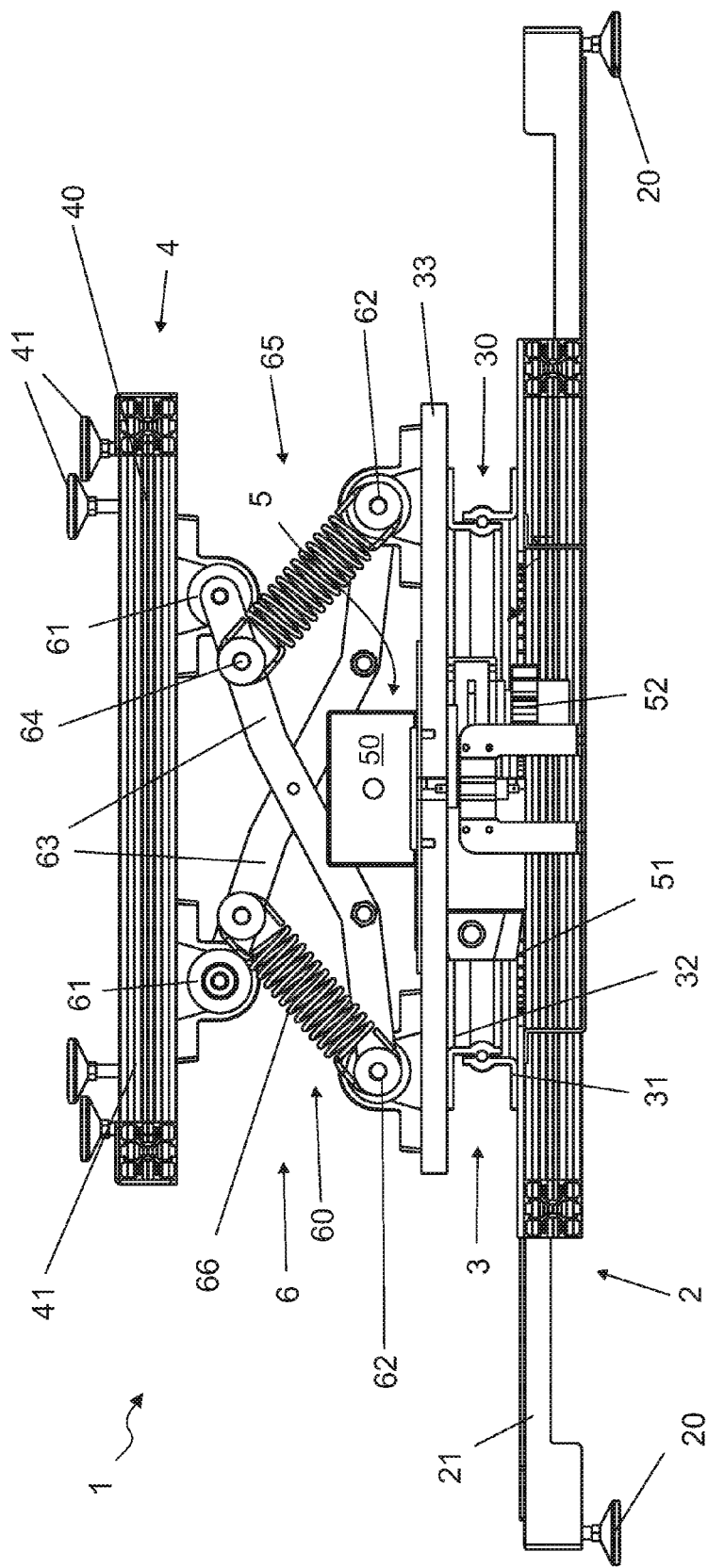
FIG. 4 is a median cross-section of the device according to the invention.
Figure 6:
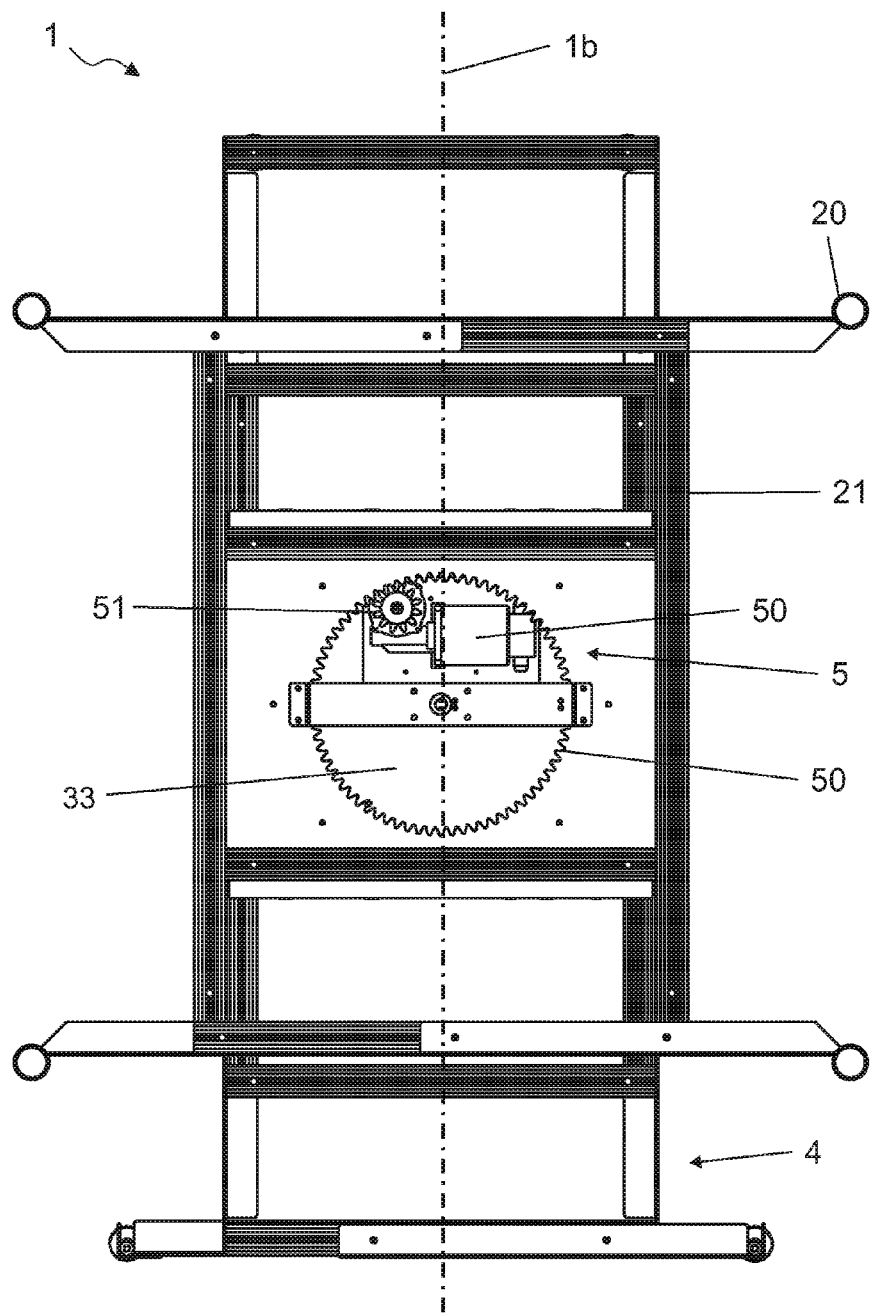
FIG. 6 is a view from below of the simulator device according to the invention.

The rotatable connection means 3 further comprise a rotatable bearing 30, suitable to permit the rotation of the said platform 33 with respect to said fixed structure 2 and to constrain the movements and rotations in other directions. The rotatable bearing 3 therefore comprises a fixed portion 31, integral with the fixed structure 2, and a rotatable portion 32, integral with the platform 33 (FIGS. 4 and 6). The simulator device 1 further comprises active rotation means 5, suitable to implement the active rotation around the vertical axis 1*a*, preferably without hindering the passive rotation of the platform 33 with respect to the fixed structure 2. They preferably comprise a toothed wheel or fifth wheel 50, integral with the fixed structure 2 and part of the same, a pinion 51, engaged with the fifth wheel 50 and a first motor 52 guiding the pinion 51 and preferably supported on the platform 33. The motor 52 is preferably of the electrical type.

The said active rotation means 5 are then functionally connected to a rudder, preferably electrically and possibly to an electronic and/or mechanical actuator. Said active rotation means 50 and rudder are thus suitable to simulate the behaviour of a boat as a result of commands given by the manoeuvring of the rudder through a rope hook-up connected from the rudder to a joystick of the electronic type.

The active rotation means 50 are, in addition, suitable to allow free or at least partially free movements since subject to friction and the force of the first motor 52. It therefore preferably consists of an electric DC (12V) motor controlled by an electronic driver, which allows the free movement of the toothed wheels 50 and 51 without intervening on the same when stressed by external forces.

The support structure 4 is constrained to said rotatable connection means 3 and is thus rotatable around the axis 1*a* together with the rotatable structure.

It preferably comprises rods 40 arranged in a quadrilateral with supports 41 to permit the constraint of the boat 100. Said supports are preferably mushroom-shaped elements suitable to allow the support of ropes or belts for the constraint of the boat 100 to the support device 41.

The support structure 4 is further able to tilt angularly around a longitudinal axis 1*b*, preferably arranged in the horizontal plane, and thus perpendicular to said vertical axis 1*a*, and coinciding, during use, with the longitudinal axis of the boat 100.

The support structure 4 is in fact connected to the rotatable connection means 3 by tilting connection means 6, preferably comprising an articulated quadrilateral 60 and elastic contrast means 65 of the oscillations.

In particular, there is a plurality, preferably two or four, of articulated quadrilaterals 60 arranged parallel and aligned along the longitudinal axis 1*b*. The number of parallelograms is suitably related to the size of the sailing boat 100.

Figure 5:
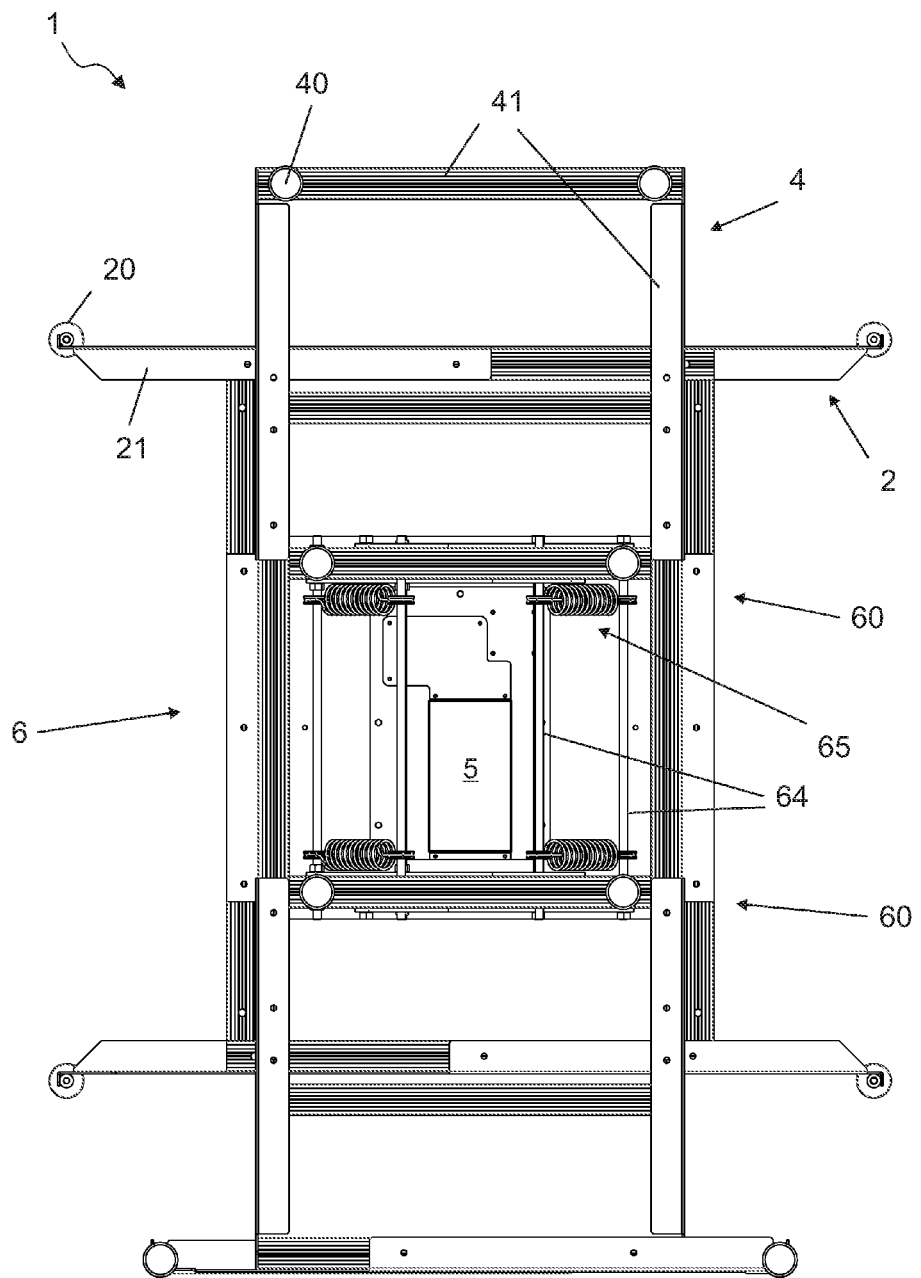
FIG. 5 is a view from above of the simulator device according to the invention.

The articulated parallelogram 60 is preferably composed of two lower hinges 61, connected to the lower, non-tilting element, preferably the platform 33 or the base 2, two upper hinges 62, connected to the upper tilting element, preferably to the support structure 4 or to the platform 33, depending on how the device 1 is configured. Preferably, the upper hinges 62 define a side shorter in length than the side defined by the lower hinges 61 and furthermore said sides are vertically aligned in the rest position (FIGS. 1 and 5).

The rods 63 which connect the lower hinges 61 to the upper ones 62 are preferably mutually intersected, i.e. the right lower hinge 61 connects to the left upper hinge 62, while the left lower hinge 61 connects to the right upper hinge 62. Said articulated parallelogram 60 is thus preferably a known Chebyshev linkage but it is used only in the straight part 63 with the intersected rods 63. The "Chebyshev linkage" is known for achieving a perfect rotational translation along a horizontal line of the midpoint of the upper side, i.e. the side that connects the upper hinges 62.

Figure 2:
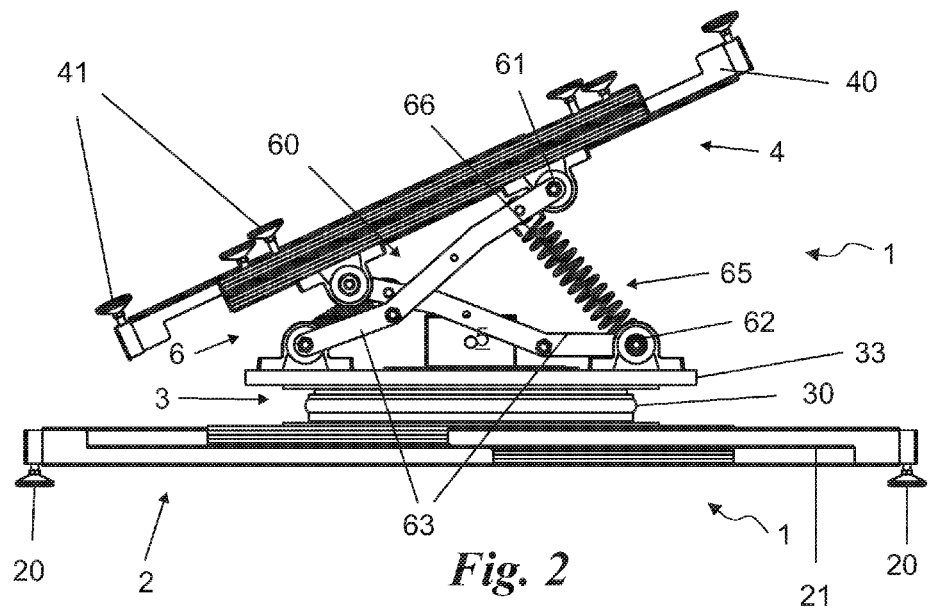
FIG. 2 is a view of FIG. 1 in a different configuration of the simulator device according to the invention.
Figure 3:
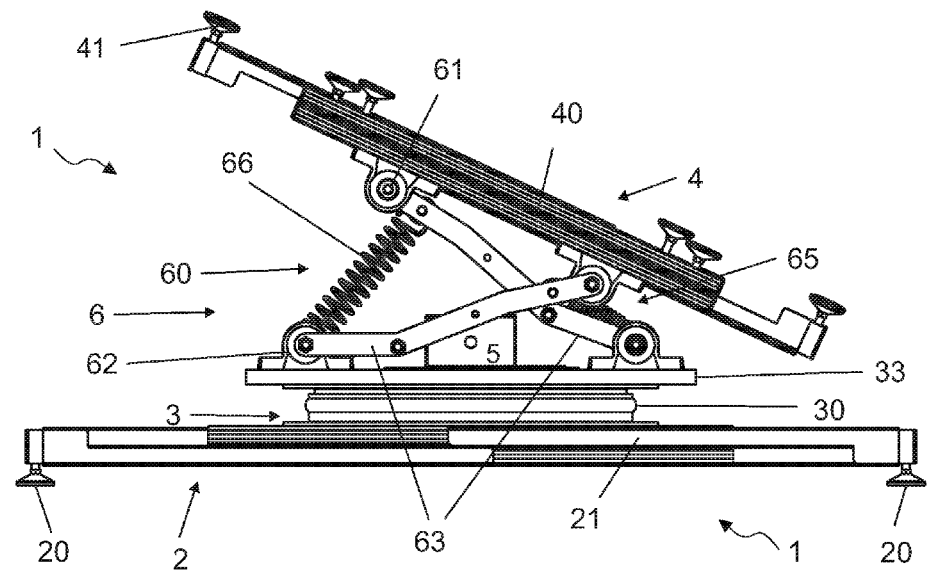
FIG. 3 is a view of FIG. 1 in a further configuration of the simulator device according to the invention.

Structurally, the rods 63 are preferably metal and with a square section and comprise a bent portion to avoid interference with the upper hinges 62 in positions of maximum bending, so as to allow a bending of a maximum angle of 25° both on one side and the other (FIGS. 2 and 3). The hinges 62 and 61 are in themselves known and for example with ball bearings, bushings or the like. In addition, the separate quadrilaterals 60 comprise connection rods 64 extending in the longitudinal direction 1*b*, suitable to reinforce the structure.

The elastic means 65 preferably comprise linear elastic elements 66. Said linear elastic elements 66 are suitable to exert the elastic action mainly along a straight line, are preferably of the traction type and two in number for each articulated quadrilateral 60. They are also preferably steel helical springs. The linear elastic elements 66 are positioned in a non-intersected manner i.e. a first end of the linear elastic means 65 is placed in proximity or in correspondence with the right lower hinge 61, and the opposite end is placed in correspondence or in the vicinity of the right upper hinge 62. Preferably, said right linear elastic element 66 is positioned lower down on the same axis as the right lower hinge 61 and above an axis slightly displaced from the axis of the right upper hinge 62 and constrained to a connection rod 64. Obviously, the left linear elastic element 66 acts like a mirror image of the right element.

Said linear elastic elements 66 thus realize a maximum compression force when the side of the parallelogram 60 which they act on is of a maximum size (the right side in FIG. 2 and left side in FIG. 3) and minimum or no force when the side of the quadrilateral 60 which they act on is of minimal size (the left side in FIG. 2 and the right side in FIG. 3).

The simulator device 1 may then comprise: accelerometers, various sensors and an electronic processor suitable to control the active rotation means 5 or other.

The simulation apparatus 1 comprises, lastly, a connection with the electricity grid or with a generator in order to power the active rotation means 5, the possible electronic processor and any other members. It is to be noted that an electrical connection of the partially movable type suitable to transmit electrical current from a fixed to a rotating portion is also provided.

Said electrical connection is preferably of the type with brushes or brushless and is positioned substantially along the vertical axis 1a between the fixed structure 2 and the platform 33.

The functioning of a simulator device 1, described above in a structural sense, is as follows.

The simulator device 1 is positioned in a preferred place. In particular in a windy place or in the vicinity of large fans or the like.

A sailing boat 100, in particular of the mobile centreboard, laser or the like type is placed on the support structure 4 and made integral with the same, preferably with the help of ropes and the like.

The sailing boat 100 may be specially modified, for example the centreboard may be shortened.

The simulator device 1 is thus ready to be used.

A user gets onto the boat 100 and uses it just like a boat in the water.

By means of the sails 101 the user exerts, through the force of the wind, a force in a longitudinal direction 3a, detected by the accelerometer and communicated to appropriate electrical or mechanical control means.

The user may also make turns by means of the sails 101 or use the rudder.

In the first case the boat 100 exerts a force in a direction perpendicular to the longitudinal direction 1b. The boat 100 rotates around the vertical axis 1a and the longitudinal axis 1b in contrast to the elastic means 65.

The elastic means 65 then simulate the righting thrust of the water, in an optimal manner and preferably without the need for additional motors or elements.

When the boat 100 rotates around the vertical axis 1a the connection means 3 and 4 rotate with it.

The resistance to rotation of the boat 100 can also be varied by the active rotation means 5, in particular by the first motor 52 by means of an electronic device to simulate the real behaviour of the boat 100 in water.

The invention achieves important advantages.

In fact, the simulator device 1, makes it possible to simulate sailing on a real, sailing boat 100, presenting inclinations, reactions and behaviour identical to a boat 100 used in water.

The simulator device 1 is also compact, of small size and easy to transport. For example it can be transported in the boot of a car of standard size.

Lastly, it is simple and economical, for example composed almost exclusively of mechanical means.

Variations may be made to the invention without departing from the scope of the inventive concept defined in the independent claims and by their technical equivalents.

All details may be replaced with equivalent elements and the materials, shapes and dimensions may be any within the scope of protection defined by the claims.

The invention claimed is:

1. A simulator device of a sailing boat comprising:
   a fixed structure, configured to support said simulator device on the ground;
   a support structure configured to firmly support said sailing boat;
   a rotatable connection means of said support structure to said fixed structure, configured to allow the rotation of said support structure around a substantially vertical axis and with respect to said fixed structure; and
   a tilting connection means of said support structure to said fixed structure, configured to allow the rotation or tilting of said support structure around a longitudinal axis, perpendicular to said vertical axis, wherein said tilting connection means comprise
   an articulated quadrilateral comprising:
      two lower hinges connected to a lower non-tilting element,
      two upper hinges connected to an upper tilting element,
      rods which connect said lower hinges to said upper hinges in an intersecting manner, and
      elastic contrast means of the tilting of said articulated quadrilateral.

2. The simulator device according to claim 1, wherein said elastic contrast means comprise linear elastic elements, two of which are present for each of said articulated quadrilaterals, each of said linear elastic elements being configured to exert the elastic action mainly along a straight line, and wherein said linear elastic elements have ends positioned near or at said hinges and are positioned on said articulated quadrilateral in a non-intersecting manner.

3. The simulator device according to claim 2, wherein said linear elastic elements are traction springs.

4. The simulator device according to claim 3, wherein said elastic contrast means comprise exclusively said linear elastic elements.

5. The simulator device according to claim 1, comprising a plurality of said articulated quadrilaterals parallel to each other and aligned along said longitudinal axis.

6. The simulator device according to claim 1, wherein said longitudinal axis is placed on a substantially horizontal plane and coincides in use with the longitudinal axis of said boat.

7. The simulator device according to claim 1, wherein said articulated quadrilateral is a "Chebyshev linkage".

8. The simulator device according to claim 1, comprising active rotation means configured to actuate the active rotation around said vertical axis.

9. The simulator device according to claim 8, wherein said active rotation means comprise a fifth wheel, integral with said fixed structure and part thereof, a pinion, engaged with said fifth wheel and a first motor guiding said pinion and preferably supported on said rotating structure.

10. The simulator device according to claim 9, wherein the active rotation means are operatively connected to a rudder of said sailing boat.

* * * * *